United States Patent
Holm et al.

(10) Patent No.: US 8,190,659 B2
(45) Date of Patent: May 29, 2012

(54) DIGITAL FILE MANAGEMENT SYSTEM WITH UNSTRUCTURED JOB UPLOAD

(75) Inventors: Aaron H. Holm, Brooklyn, NY (US); Steven P. Kalalian, New York, NY (US)

(73) Assignee: Industrial Color, Inc., New York, NY (US)

( * ) Notice: Subject to any disclaimer, the term of this patent is extended or adjusted under 35 U.S.C. 154(b) by 637 days.

(21) Appl. No.: 11/873,965

(22) Filed: Oct. 17, 2007

(65) Prior Publication Data

US 2008/0235281 A1 Sep. 25, 2008

Related U.S. Application Data

(60) Provisional application No. 60/896,186, filed on Mar. 21, 2007.

(51) Int. Cl.
*G06F 17/30* (2006.01)

(52) U.S. Cl. .......... 707/828; 707/791; 707/821

(58) Field of Classification Search .......... 707/104.1, 707/791, 821, 828
See application file for complete search history.

(56) References Cited

U.S. PATENT DOCUMENTS

| | | | |
|---|---|---|---|
| 6,349,301 B1* | 2/2002 | Mitchell et al. | 707/E17.032 |
| 6,574,655 B1 | 6/2003 | Libert | |
| 6,615,253 B1 | 9/2003 | Bowman-AMuah | |
| 6,996,720 B1 | 2/2006 | DeMello | |
| 7,039,873 B2* | 5/2006 | Morris et al. | 707/E17.01 |
| 7,437,705 B1* | 10/2008 | O'Bryan et al. | 717/100 |
| 7,698,634 B2* | 4/2010 | Bhatia et al. | 715/239 |
| 7,793,217 B1* | 9/2010 | Kim et al. | 715/255 |
| 2002/0133516 A1* | 9/2002 | Davis et al. | 707/513 |
| 2003/0093399 A1* | 5/2003 | Clarke et al. | 707/1 |
| 2003/0204814 A1* | 10/2003 | Elo et al. | 715/513 |
| 2005/0192924 A1* | 9/2005 | Drucker et al. | 707/1 |
| 2005/0246193 A1* | 11/2005 | Roever et al. | 705/1 |
| 2006/0015471 A1* | 1/2006 | Wu | 707/1 |
| 2006/0259982 A1* | 11/2006 | Upendran | 726/27 |
| 2006/0294112 A1* | 12/2006 | Mandato et al. | 707/100 |
| 2007/0011184 A1* | 1/2007 | Morris et al. | 707/101 |
| 2007/0028172 A1* | 2/2007 | Greer et al. | 715/705 |
| 2007/0038610 A1* | 2/2007 | Omoigui | 707/3 |
| 2007/0073776 A1 | 3/2007 | Kalalian et al. | |
| 2007/0226169 A1* | 9/2007 | Solyanik et al. | 707/1 |
| 2008/0013916 A1* | 1/2008 | Sharpe et al. | 386/52 |

* cited by examiner

*Primary Examiner* — Rehana Perveen
*Assistant Examiner* — Tiffany Thuy Bui
(74) *Attorney, Agent, or Firm* — Fish & Richardson P.C.

(57) ABSTRACT

Uploading digital assets from a source media directory into a web-based digital asset management system includes representing a structure of the source media directory, and the digital assets, as a XML object, and storing the XML object in a database. Based on the XML object, the source media directory structure and the digital assets can be displayed through a web-enabled user interface.

15 Claims, 11 Drawing Sheets

| Accounts | Users | Jobs |

IC_7421_NY_MB_PENGUIN_Original
IC_7506_NY_AE_Good_Housekeeping
M_Project_Gallery_Movement
IC_7524_LA_AM_Lifetime_Naked
IC_7416_LA_KA_People_EVE
IC_7514_LA_BW_Geffen_Simpson_Selects
Fast_Ashleys_Ping_Pong_Tournament
Saint_Barts_Video_VS
HIRES
IC_7472_NY_IW_Seventeen_Mag
IC_7509_NY_AP_Justice_For_Girls
IC_Demo_LA_IG_Time
IC_7437_NY_KP_MACYS
IC_7491_LA_KA_Fox_Bones_2
IC_7352_NY_IM_TEEN_VOGUE_KOREA
IC_7392_NY_IF_ELLE
IC_7379_NY_IS_Dillard's
IC_7370_NY_IF_A_MAGAZINE
IC_7349_LA_MN_Maxim_Oct
IC_7434_NY_IS_EW_MAG
✓ --select souce--

View Jobs | Add New Job

Add new job

Synchronization
* Account
* Source Folder
  Color Profile          ☐ Convert all new images to sRGB
Job Information
* Job Code              [sample code]
* Job Name              [sample name]
* Job Description       [sample description]
* Shoot Location        [sample location]
* Photographer          [sample photographer]
  Episode Namer         [sample episode]
  Art Director          [sample art director]
Job Upload Information
* Upload Technician     [sample upload technician]
  Local Office          [sample office]
  Photo Assistant       [sample assistant]
  Photo Producer        [sample producer]
  Capture Technician    [sample capture technician]

( CANCEL )  ( CREATE JOB )

FIG. 4A

| Accounts | Users | Jobs |

Add new role

Role Information
* Role Name          *Indicates a required field

Description

* Account    -select account-

View
☑ All
☐ Plus Rated    ☐ Selects
☐ Alts          ☐ Approved
☐ Killed        ☐ Unkilled

Rating Options
Plus      ⊙ Modify  ○ View  ○ Hide
Select    ⊙ Modify  ○ View  ○ Hide
Alt       ⊙ Modify  ○ View  ○ Hide
Approve   ⊙ Modify  ○ View  ○ Hide
Kill      ⊙ Modify  ○ View  ○ Hide ☐ Allow to share Selects, Alts, Approves,    ☐ Allow to review Selects, Alts, Approves,
  Kills and (+) Ratings with other members       Kills and (+) Ratings made by other members ( CANCEL )  ( CREATE ROLE )

( Back )

| Job | Folder | User | Role | Exp. Date | | | Kill % | |
|---|---|---|---|---|---|---|---|---|
| Dresden Files - Second City | All | Aaron Holm | Normal (Industrial Color) | ▭ | ▭ | ▭ | ▭ | Reassign |
| Old Navy Summer 1 | All | Aaron Holm | Normal (Industrial Color) | ▭ | ▭ | ▭ | | Reassign |
| Ribkoff / Kraftworks | All | Aaron Holm | Normal (Industrial Color) | ▭ | ▭ | ▭ | | Reassign |
| Splat | All | Guest User | Normal (Industrial Color) | ▭ | ▭ | ▭ | | Reassign |
| Splat | All | GEV3 Demo | Normal (Industrial Color) | ▭ | ▭ | ▭ | | Reassign |
| Medical | All | Aaron Holm | Normal (Industrial Color) | ▭ | ▭ | ▭ | | Reassign |
| Ford Supermodel Contest | All | GEV3 Demo | Normal (Industrial Color) | ▭ | ▭ | ▭ | | Reassign |
| Ford Supermodel Contest | All | V3 Demo | Normal (Industrial Color) | ▭ | ▭ | ▭ | | Reassign |
| MJB | All | Aaron Holm | Normal (Industrial Color) | ▭ | ▭ | ▭ | | Reassign |
| Limited Too | All | Aaron Holm | Normal (Industrial Color) | ▭ | ▭ | ▭ | | Reassign |

Accounts | Users | Jobs

View Jobs | Add New Job | Assign Job to Account | Assign Job to Member | Assign High Res Images SEARCH: All Jobs SAVE CHANGES / Save

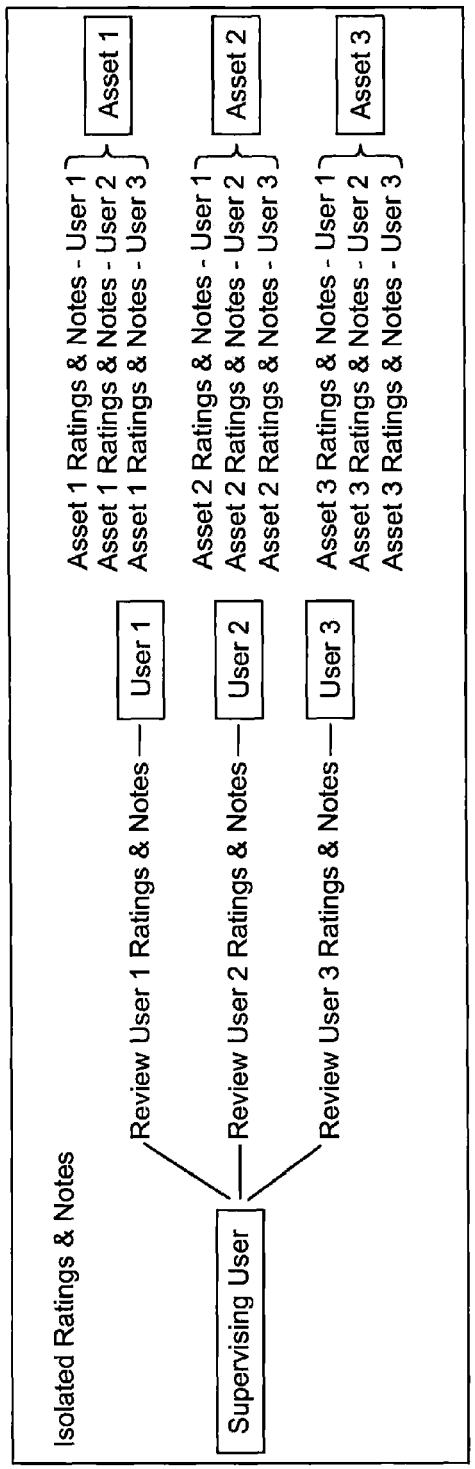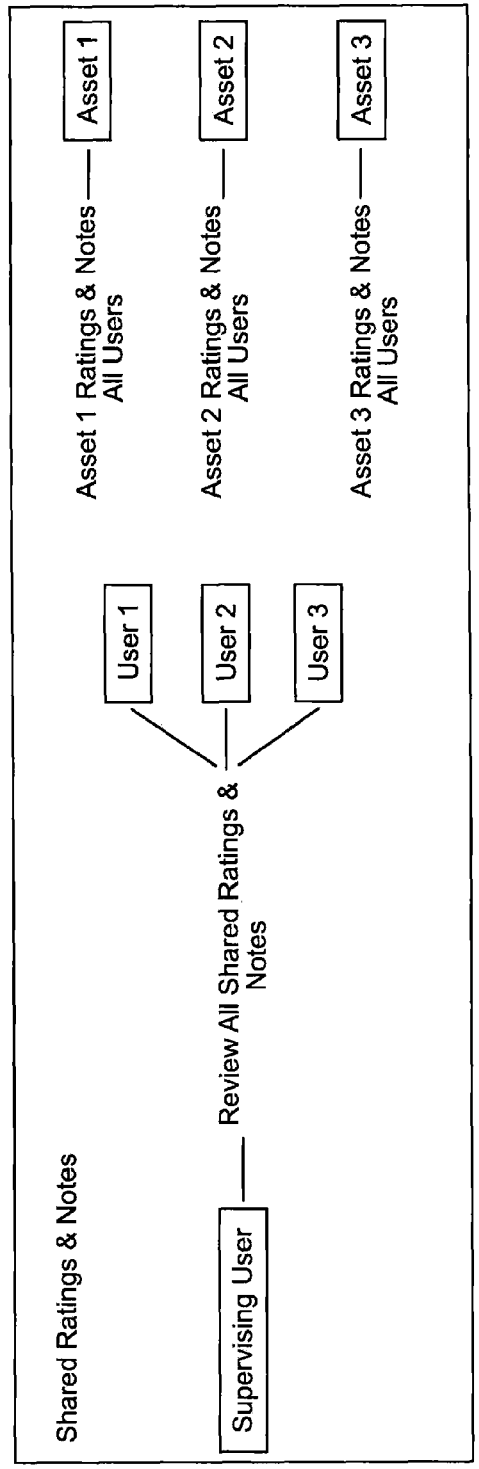

DIGITAL FILE MANAGEMENT SYSTEM WITH UNSTRUCTURED JOB UPLOAD

CROSS-REFERENCE TO RELATED APPLICATION(S)

This application claims the benefit of priority of U.S. Provisional Patent Application No. 60/896,186, filed on Mar. 21, 2007.

BACKGROUND

Digital file management can include a wide range of processes such as capturing the digital files, processing the files and delivering the finished files. Many individuals with different roles may be involved in various aspects of the process. In addition, the individuals who are collaborating on a particular project often are in different geographical locations.

For example, in the context of a digital photograph shoot, the parties involved may include the photographer, the talent, the art director and the client. Each of those parties may be in a different geographical location, yet they may need to collaborate on certain aspects of the project. Thus, while the photographer may be at the site of the shoot, the art director, whose input is required as the shoot proceeds, may be located far away in a different part of the world.

U.S. Patent Publication No. 2007/0073776, which is assigned to the assignee of this current application, discloses an enterprise-level, digital asset management system that enables users to upload digital assets (e.g., digital files such as photographs) to a central on-line site and to view, edit, manage, arrange, organize, annotate and adjust the digital images. Multiple parties can communicate and collaborate with one another substantially in real-time in connection with a project involving the digital images. The images can be stored, archived, edited, sorted and sent using a central web-accessible workspace that can be accessed remotely by the various persons working on the project. Users (e.g., clients) can order post-production services such as file processing, direct print output, downloads to media, file transfers, file archiving and retrieval. The system can be fully automated to allow users to access their digital assets independently, as well as order and pay for services through a built-in ordering component. The system can consolidate various aspects of the digital photography workflow.

The present disclosure relates to additional features that can be incorporated into a digital asset management system, such as the system disclosed in the foregoing patent application.

SUMMARY

This disclosure relates to digital file management.

Various aspects are disclosed in the detailed description below, the accompanying drawings, and the claims.

For example, according to one aspect, uploading digital assets from a source media directory into a web-based digital asset management system includes representing a structure of the source media directory, and the digital assets, as a XML object, and storing the XML object in a database. Based on the XML object, the source media directory structure and the digital assets can be displayed through a web-enabled user interface.

Representing the source media directory structure and the digital assets as a XML object can include, in some cases, recursively traversing the source media directory and to build the XML object. The XML object can include, for example, a relational folder structure indicative of where folders in the source media directory are located with respect to one another. The XML object further can include information indicative of the location of the digital assets within the source media directory, as well as information about the name and properties of the digital assets.

In some implementations, the source media directory includes a sub-directory. The source media directory structure can be uploaded, for example, from a client location.

Some implementations can include creating a second XML object representing the source media directory structure. The second XML object, which contains no information about the location, name and properties of the digital assets, also is stored in the database. A visual display can be provided, through the web-enabled user interface, of the source media directory structure and the digital assets based on the second XML object.

According to a related aspect, a system for uploading digital assets from a source media directory into a web-based digital asset management system includes a database and a server operable to represent the source media directory structure, and the digital assets, as a XML object and to store the XML object in the database. A web-enabled user interface coupled to the server is operable to display the source media directory based on the XML object.

In another related aspect, an article includes a machine-readable medium storing machine-readable instructions that, when applied to the machine, cause the machine to represent a source media directory structure of digital assets, and the digital assets, as a XML object and store the XML object in a database.

Other features and various advantages will be apparent from the following detailed description, the accompanying drawings, and the claims.

BRIEF DESCRIPTION OF THE DRAWINGS

FIG. 4A illustrates an example of an administrator interface screen to facilitate uploading a job.

FIG. 8 illustrates an example of a user interface screen that allows the administrator to assign a user to particular roles and jobs.

FIG. 9 illustrates an example of a user interface screen that allows an administrator to assign a user to particular roles and jobs.

FIG. 10A illustrates an example of the relationship between users and their access to information about digital assets associated with a particular job in an isolated mode.

FIG. 10B illustrates an example of the relationship between users and their access to information about digital assets associated with a particular job in a shared mode.

DETAILED DESCRIPTION

Figure 1:
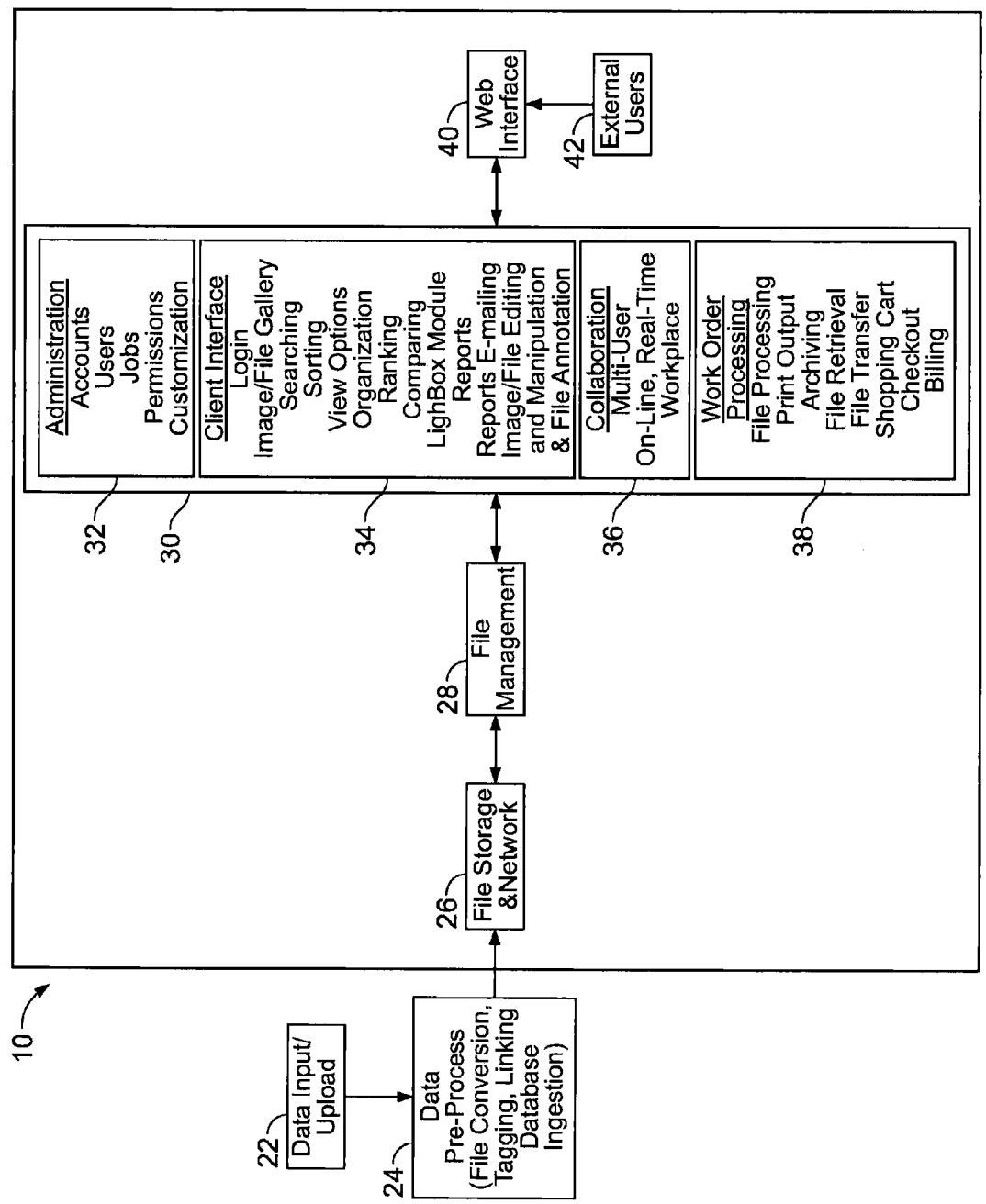
FIG. 1 is a block diagram illustrating an example of a digital asset management system.

FIG. 1 illustrates a block diagram of an implementation of a digital asset management system 10. The system includes various modules, each of which may be implemented in hardware, software or a combination of hardware and software, and may include, for example, one or more databases and servers. The various modules may be implemented separately or they may be integrated, depending on the particular needs of the system. Some features of the system can be implemented in computer programs executing on programmable computers. Each program can be implemented, for example, in a high level procedural or object-oriented programming language to communicate with a computer system. Furthermore, each such computer program can be stored on a storage medium, such as memory readable by a general or special purpose programmable computer or processor, for configuring and operating the computer when the storage medium is read by the computer to perform the functions described.

The system 10 includes a data input/upload module 22, which allows digital files to be uploaded to the system. Although the particular implementation described below focuses on digital image files such as digital photographs, various implementations may incorporate other types of digital files including, for example, data files, video files, audio files, application files and documents. In some implementations, the digital files can be uploaded directly to a file server. Other implementations may use a remote upload, for example, via the Internet or other network. A data pre-processing module 24 performs such processes as tagging the uploaded files with metadata and keywords, creating preview images from raw and high resolution image files, and linking the preview and high resolution files. The system includes a file storage and network module 26 as well as a file management module 28.

A main module 30 has several sub-modules that allow users to interact with the system. The main module 30 includes an administration sub-module 32, a client or user interface sub-module 34, a collaboration sub-module 36 and a work order processing sub-module 38. The administration sub-module 32 allows an administrator to establish accounts, jobs and permitted activities for individual users. The client or user interface sub-module 34 allows a user to log into the on-line system, view image files stored in the system, search and sort image files, view options, rank or compare image files, store selected image files in separate folders, and edit and annotate image files, among other functions. The collaboration sub-module 36 allows multiple users of the system effectively to share an on-line workspace in real-time. The work order processing sub-module 38 allows a user to place selected image files in an electronic shopping cart and to place orders for prints of the selected files.

A web-interface module 40 allows users using external devices 42 (e.g., personal or laptop computers) to access the system 10 through a website on the Internet or other network. User applications residing on the external devices 42 may include, for example, an Internet browser, a file transfer protocol (FTP) client application, e-mail and a virtual private network (VPN) for approved client access.

Figure 2:
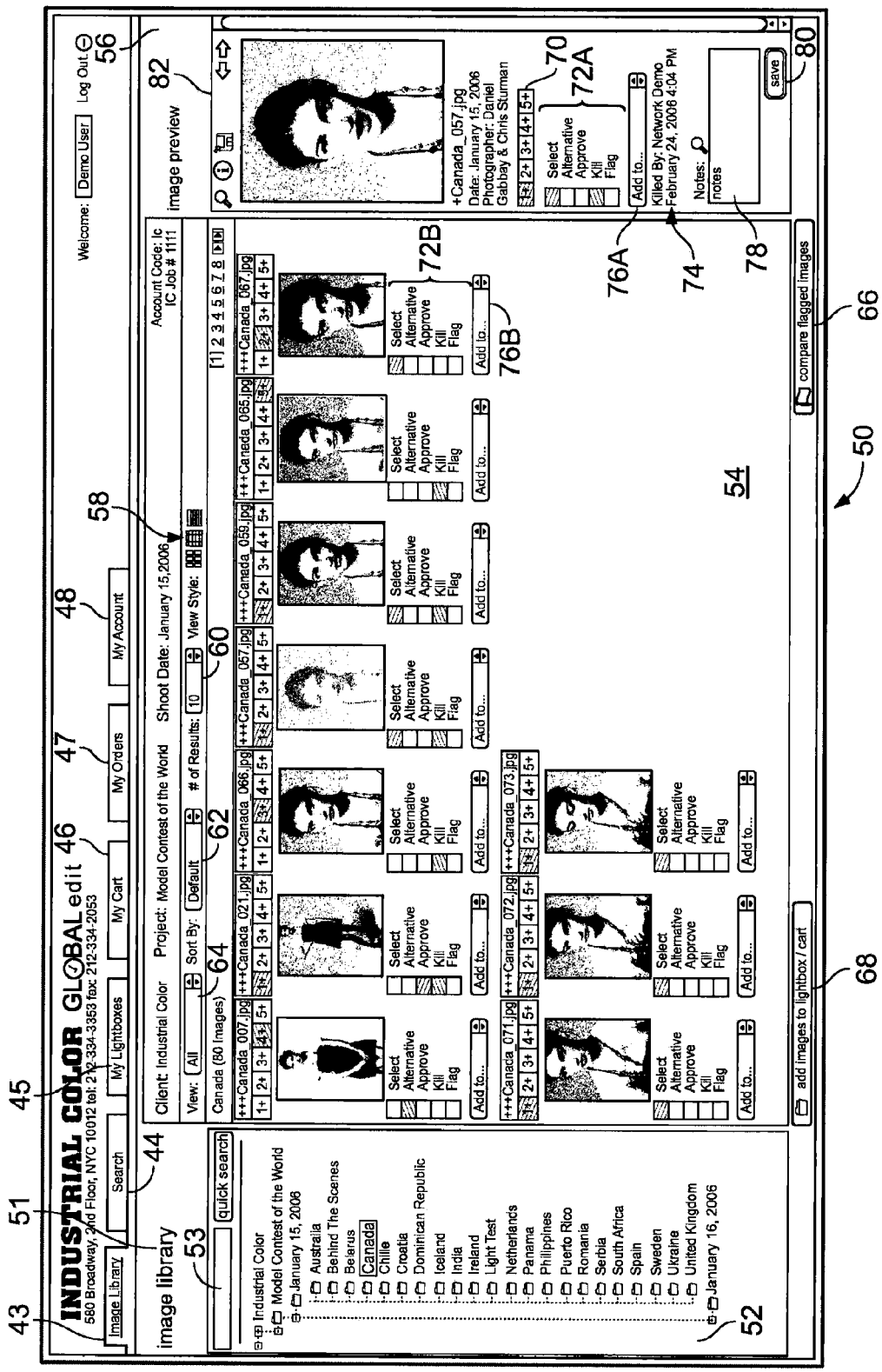
FIG. 2 is an example of a user interface screen that facilitates management of digital images.

FIG. 2 illustrates an example of a screenshot that allows a user to access, manipulate and manage its image files. Once the user logs in, the system 10 provides customized access and views based on parameters established for that user by a system administrator. As shown in FIG. 2, after logging in, the system provides a screenshot 50 that has several tabs (43 through 48) that allow the user to select the various functions available from the system. In the illustrated example, the default view corresponds to tab 43, labeled "Image Library." Other tabs are labeled "Search" tab 44, "My Lightboxes" tab 45, "My Cart" tab 46, "My Orders" tab 47 and "My Account" tab 47. The screen view for administrative users may include an additional tab labeled, for example, "Administration."

As shown in the example of FIG. 2, the screen 50 displayed to a user is divided into three section: an image library section 51, an image gallery section 54, and an image preview section 56.

The image library section 51 displays a job tree or directory 52. In the context of digital images (e.g., photographs), for example, the job tree provides a hierarchical listing of jobs, shoot dates, shots and images. A particular job may include data from one or more shoot dates each of which has one or more shots associated with it. Each shot includes one or more images. The user can navigate through the job tree 52 and select a particular job, shoot date or shot by moving the cursor on the computer screen display to a particular item and clicking on that item. An electronic mouse or similar device can be used to move the cursor to the desired area of the screen. A user can search for a particular item in the job tree 52 by entering the name of the individual file or collection of files into a search area 53, and clicking the adjacent "quick search" button.

The screen 50 allows the user to select one of several views in which the selected image files are presented in the image gallery section 54 by moving the cursor and clicking on one of several icons 58 that appear in the screen. The default view, which is shown in FIG. 2, is a thumbnail presentation of the images. Other views that can be provided include a listing of the image files and a metadata view of the images. The metadata view allows the user to view the image of each selected file together with certain metadata related to the image.

The image preview section 56 displays a medium size view of a particular one of the images that can be selected, for example, by clicking on that image in the image gallery 54. In the illustrated implementation, the image preview section 56 is present regardless of which view of the image gallery 54 is selected (e.g., thumbnail, list or metadata).

The user can enter various information into the system in connection with a particular image in the image preview section 56 or with respect to an image in the default view of the image gallery section 54. For example, the user can click on one of the boxes 70 in the image preview section 56 so as to rank or score the image on a scale of one to five. Another group of boxes 72A allows the user to indicate an action that is to be taken with respect to the particular image. In the illustrated implementation, possible actions include "select," "alternate," "approve," "kill" and "flag." The boxes labeled "select," "alternate," "approve" and "kill" also reflect a form of user ratings. For example, a user may wish to indicate that a particular image is approved for use in the particular project or that the image is "killed" and should not be considered for use in the project. Additional groups of boxes 72B appear beneath each image in the default view of the image gallery 54 (FIG. 2). The functions of the boxes 72B is the same as the function of the corresponding boxes 72A in the image preview section 56. If the box labeled "flag" is selected, then the particular image will be acted upon when the "compare flagged images" button 66 (located at the lower right-hand side of the screen) is selected. The functionality of the "compare flagged images" button 66 is discussed below. The image preview section 56 also lists information 74 as to who initiated a particular action with respect to the displayed image and when the action took place.

A drop-down menu 76A in the image preview section 56 allows the user to add the displayed image to one of several folders (e.g., a lightbox or shopping cart). Below each image in the default view of the image gallery 54 is a drop-down menu 76B that functions in a similar manner to the drop-down menu 76A. Images also can be added to a lightbox or cart by clicking the button 68.

The image preview section 56 includes an area 78 where the user can enter text notes relating to the image. Information entered in the text notes section 78 can be saved by clicking the "save" button 80 in the image preview section 56. The notes are saved in a database and are tracked so that all notes associated with a particular image can be viewed in a history thread.

The screen of FIG. 2 includes a drop-down menu that allows the user to apply one of several filters and sorting arrangements to the content that appears in the image gallery 54. In the default mode, information for all the images in the selected section of the image library 52 are displayed in the image gallery 54. However, the drop-down menu 64 labeled "view" allows the user to limit the images that appear in the gallery 54 based on criteria selected by the user. For example, the images can be filtered according to the ranking applied to the image or according to some other status information applied to the images (e.g., "selected," "alternative," "approved," "killed," "not killed" or some combination of those choices). Similarly, the user can select the order in which the image information appears in the image gallery 54 by using the "sort by" drop-down menu 62. For example, the image information can be sorted so that the images in the gallery section 54 appear in order of ranking or other status information. The upper limit on the number of images that appear in the gallery section 54 can be selected using a drop-down menu 60 labeled "# of results."

By clicking on the "compare flagged images" button 66, the system displays selected images to allow side-by-side comparison. The images can be selected for inclusion in the side-by-side comparison by clicking on the boxes 72A (or 72B) labeled "flag" corresponding to the desired images.

The system also includes an image editor that provides various tools to allow a user to view magnified versions of the images and to make annotations and mark-ups on the image or to make various color or other changes to the image.

Some of the foregoing features are discussed in greater detail in U.S. Patent Publication No. 2007/0073776, the disclosure of which is incorporated by reference.

Unstructured Job Uploads

An additional aspect relates to how the job tree 52 (see FIG. 2) is populated and addresses navigating a digital file storage directory structure via a World Wide Web user interface.

In some implementations, the digital assets that are to be uploaded into the system need to be pre-arranged into a set folder structure so that they can be uploaded accurately.

In other implementations, a job ingestion engine is provided to allow a user to select a job (which can include, for example, any number of folders, shoots and images or other digital files) from any storage point in the system so that the job can be uploaded to the user's account through a World Wide Web interface without having to pre-arrange the files that are to be uploaded in a pre-specified format.

In a particular implementation, the digital file management system includes a job ingestion engine which facilitates the ingestion of a job from any directory point on storage. The functions of the job ingestion engine can be implemented, for example, as part of the data input/upload module 22 and the data pre-process module 24 (FIG. 1). Any storage point registered with the system configuration is available as a source of the digital assets through the user interface. Storage points from any available network location (local area network, wide area network, client location, remote location) can be registered on the system and serve as an upload source. The system uses an unstructured upload of digital assets (e.g., digital images) through a web interface such that the files to be uploaded need not be in a pre-specified format.

The source directory can contain images or sub-directories that contain other directories or images. The user can choose how to organize digital assets in the source directory; the digital asset management system then takes a snapshot of the directory structure.

In the following paragraphs, an example is described using Extensible Markup Language ("XML"). Other implementations, however, use different extensible, markup and/or text-based serialization languages such as JavaScript Object Notation ("JSON").

Figure 3:
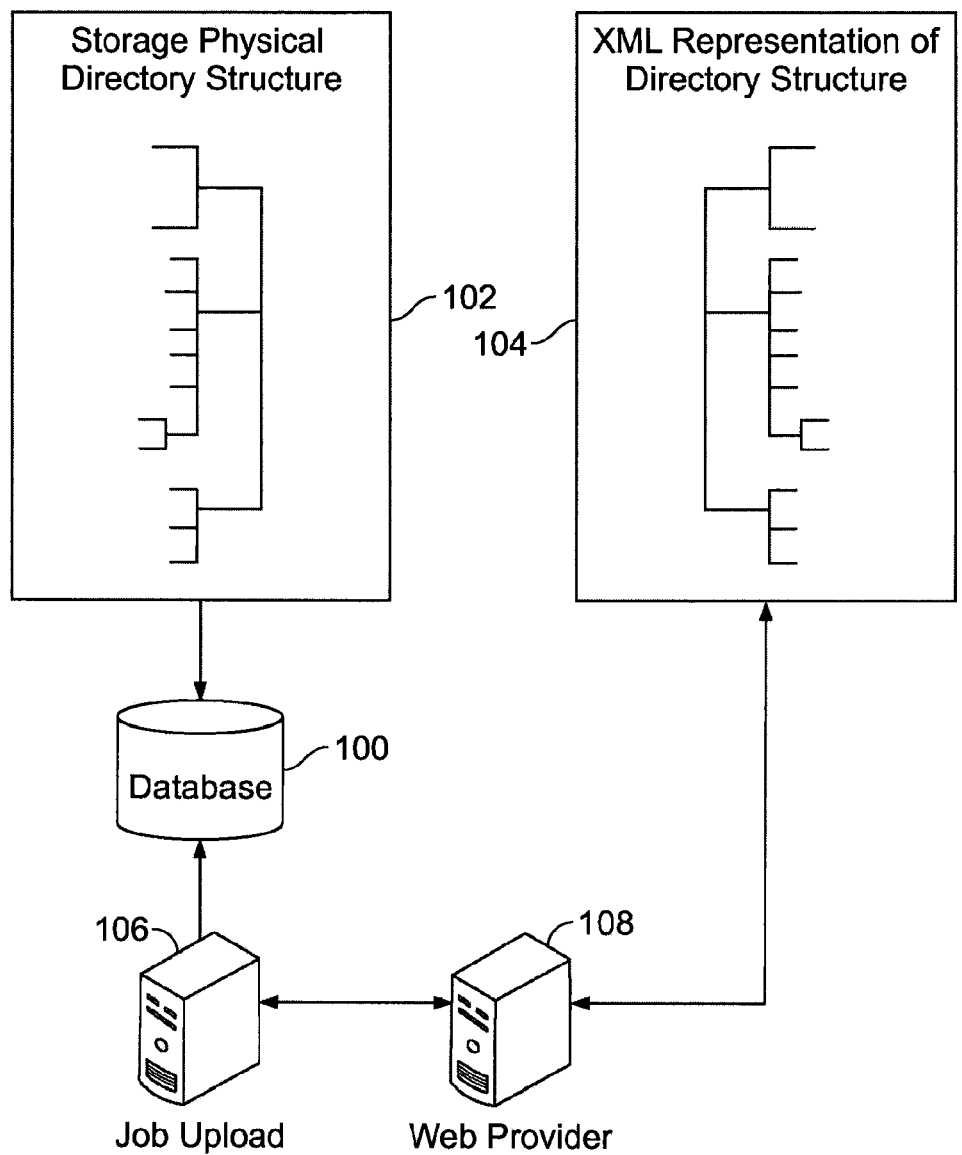
FIG. 3 is a diagram that illustrates features of the system relating to uploading digital assets to the system.

In a preferred implementation, uploading is accomplished, as illustrated in FIG. 3, by recursively traversing the source media directory 102 and building an XML document that captures and represents the original directory tree along with all JPEG images (or other digital files) contained in each directory. Subsequently, the backend service, which in some cases is implemented as a Windows™ service, continues to process the directory by storing the digital images or other digital files, as well as various data about folders that contain the JPEG images or other digital files, in a database 100.

To record the source media directory structure 102 accurately at the time of the upload, the job upload server 106 takes a snapshot of the directory structure and expresses the hierarchy in XML format in the database 100. This XML entry includes the relational folder structure (e.g., where the folders are in relation to each other; sub-folders) and the location of all JPEG images or other digital files in the directory tree. In this way, the system is aware of the relative location of all images and directories and can determine the access rights and conditions for any system user. The job upload server 106 converts the size and color profile of each digital asset at the time of the upload.

To allow a user to access the directory tree structure quickly, the backend service preferably also generates a second XML entry, which contains the folder structure only along with any necessary database directory mapping, but no information regarding the location, name and properties of any images. The second XML document is processed by the system user interface to show the user a correct representation 104 of the directory structure uploaded to the system. This allows the user to navigate through the stored files quickly so that the system provides the larger XML data for the particular digital assets (e.g., images) to the user interface only when a request to view images is made. By storing the directory contents in XML format in the database 100, the system can provide granular access permissions to each folder and image on the system.

By taking a snapshot of the directory structure and ingesting this information in XML format in the database 100, the system does not require that media be pre-arranged into a set folder structure to be uploaded accurately. Any directory containing any number of sub-directories and images can be added to the system without preparatory work.

From an administrator's perspective, the unstructured file upload allows for fast content upload without requiring a pre-defined directory structure. The original media folder structure 102 is preserved in the database 100 and presented to the user through a user interface via the web provider server 108. The job (i.e., directory and digital images) seen through the user interface is identical in structure to the media provided for upload. Each customer account can have a default upload point such as a FTP server of local server. The administrative user selects the source root directory from an 'upload job' interface (see FIG. 4A). A drop-down menu, for example, can be provided to permit selection of a desired root node in the directory. All folders and images below the selected root node are included in the job upload and indexed in the database 100 in XML format. The administrative user also can apply privileges within the context of a role against any folder within the job directory structure.

The unstructured file upload can take the form of a distributed service. Thus, the service can be installed multiple times on the same server or on multiple servers so that it can implement multiple applications at the same time.

Access to folders and images is determined according to permissions for each folder and the respective role assigned to each individual.

High Resolution File Mapping

In some cases, different asset derivatives can arrive at the system at different times and in different formats. For example, some digital assets may arrive electronically, whereas other digital assets may arrive by physical media. Thus, a user may upload a large number of jpg files via FTP, and then upload a large number of DNG files at a later date.

In the context of digital image files, for example, when uploading the digital files for a particular job, the web-enabled user interface initially receives, for example, only low-resolution files of the digital images for display. Subsequently, in response to the request of a user, the user interface can receive and display the corresponding high resolution images. By deferring transmission of the high resolution files until they are requested by a user, the overall efficiency and speed of the system can be enhanced. To make the high resolution files available through the web-enabled user interface, the high resolution files need to be associated with the corresponding low resolution files previously received through the web-enabled user interface.

This section addresses how, in some implementations, digital asset files (e.g., raw files, TIF files, high resolution files) in the source media and in the destination directory are associated with one another. More generally, this section provides a mechanism that allows the system to sift through hundreds or thousands of digital files and logically link them so the user can download or work with any available file for a given record. As explained below, the system compares the database against the files on storage and indexes all files that have the same name, but different extensions.

Figure 4:
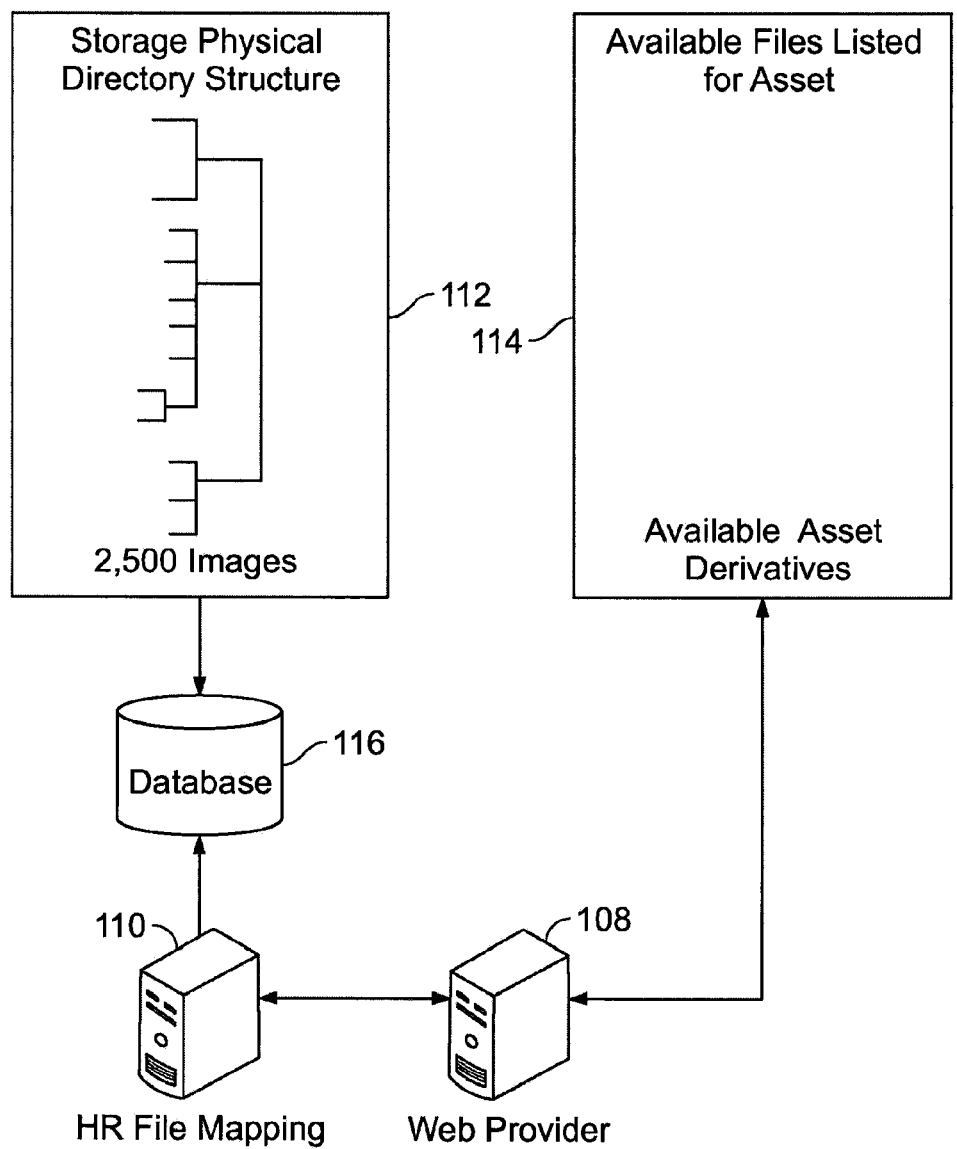
FIG. 4 is a diagram that illustrates features of the system relating to mapping high resolution files to their counterparts.

In one implementation, the digital file management system includes a high resolution file mapping service that allows administrators (or other users) to upload high resolution images by mapping existing job assets with their derivatives (i.e., the various versions of substantially the same image or other digital asset stored as files with different file extensions or as different file types). The system allows this task to be implemented not only at the shoot folder level, but also at the job level. As illustrated in FIG. 4, a high resolution mapping server 110 finds all images in the destination directory 114 that have the same file name (but different file extension or type) as a high resolution image in the source directory 112 and appends this high resolution image to the existing job asset in the destination directory. The system registers the derivative asset by interpreting the file extension or type and associating the appropriate format. If synchronization is performed at the job or shoot date level, then it opens the possibility that images in the source folder exist with identical filenames. In that case, the system prompts the user as to whether it should skip this file and continue to the next file, or whether it should abort the task. In the latter case, the system can suggest running the task for each shoot folder where a copy of the image exists.

The foregoing task can, in many cases, require a significant amount time to complete, particularly for jobs containing thousands of images. Accordingly, an Application Programming Interface (API) can be used for this feature implementation. The workflow can be described as follows. First, the user interface layer initiates a handshake with the high resolution mapping service (represented by 110 in FIG. 4) to verify that it is ready to receive data before sending it. The high resolution mapping service 110 returns a response containing all found high resolution images that match file extensions that the system supports. The response is then converted into JavaScript array. The JavaScript driven front-end scans this array by feeding each found file information back to the server. The high resolution mapping service 110 verifies whether the file is qualified as a new high resolution asset derivative. If a successful match is found, the file is copied from its source location 112 to the designated file storage, a record transaction is entered in the database 116, and the result of this operation is returned back to the caller. The database 116 can be the same as or different from the database 100 of FIG. 3.

The high resolution storage endpoint configured in the database makes it very easy to switch to a different network attached storage (NAS) box or cluster should the need arise.

A purpose of the high resolution file mapping service is to provide access to the various file versions that are produced through the lifecycle of digital media production. The initial job upload makes the low resolution preview assets available to the user for review. Once the high resolution files are available to the system (e.g., uploaded to any storage node registered in the system configuration) the high resolution file mapping service provides a mechanism for the administrator to make the high resolution files available for download to system users.

Figure 5:
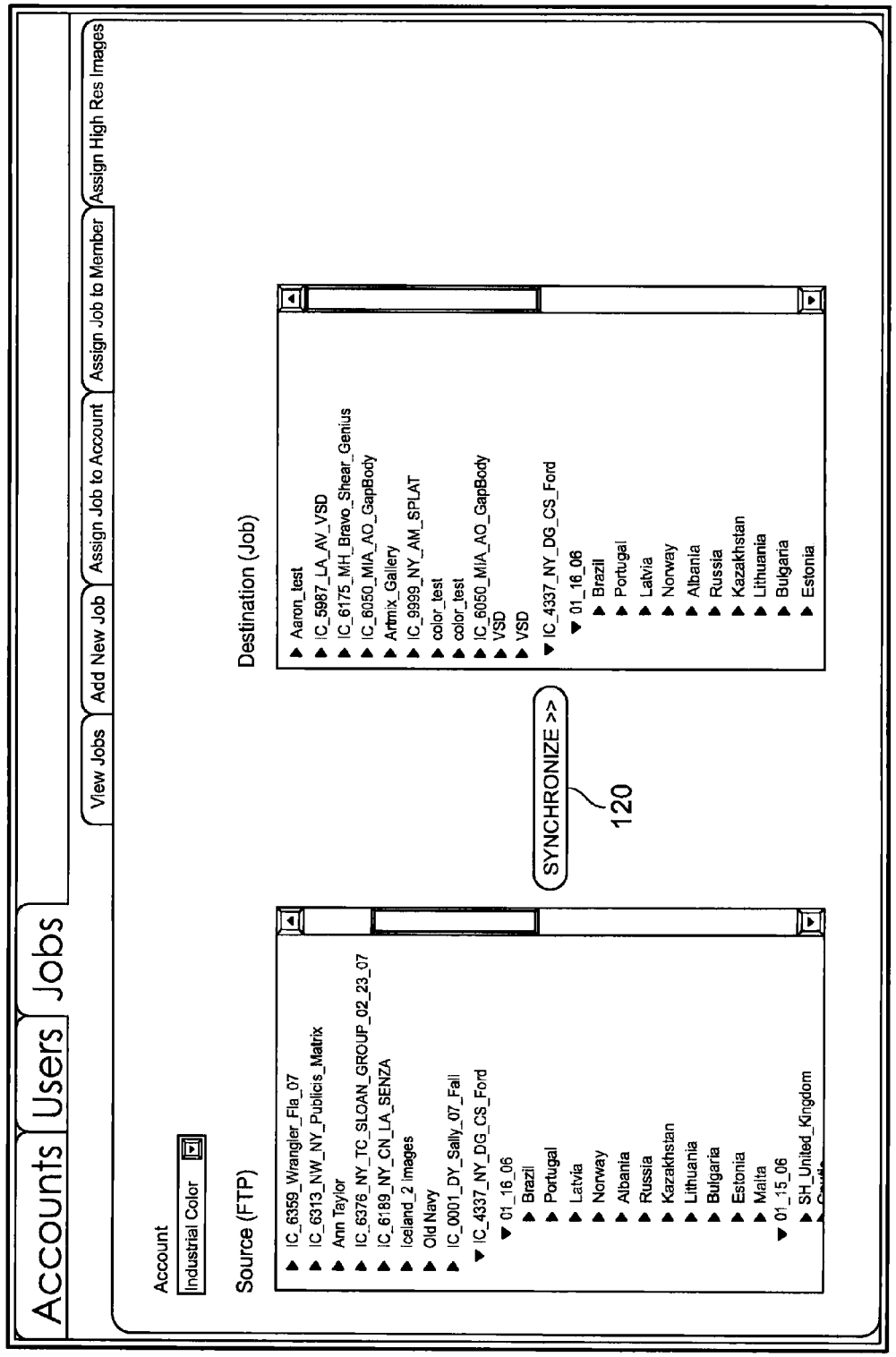
FIG. 5 is an example of administrator interface screen to facilitate high resolution file mapping.

Using the high resolution file mapping administrator user interface (see FIG. 5), the administrator chooses an account, which causes the user interface to display a default storage point for that account. The administrator then navigates the destination directory to choose the job or folder for the existing assets. Next, the administrator chooses a location in storage for the high resolution files to be associated with the low resolution files. When the administrator clicks on the "SYNCHRONIZE" button 120 (using, for example, an electronic mouse), the system searches through the designated storage point and finds all filenames that match files available in the existing job or shot. All known file types are copied to the system storage, and the database 116 is updated to reference the link between the high resolution images and the corresponding low-resolution images. In addition, the file type (e.g., PSD, RAW, CR2, TIFF) is recorded in the database along with the size of the file (e.g., in megabytes).

Figure 6:
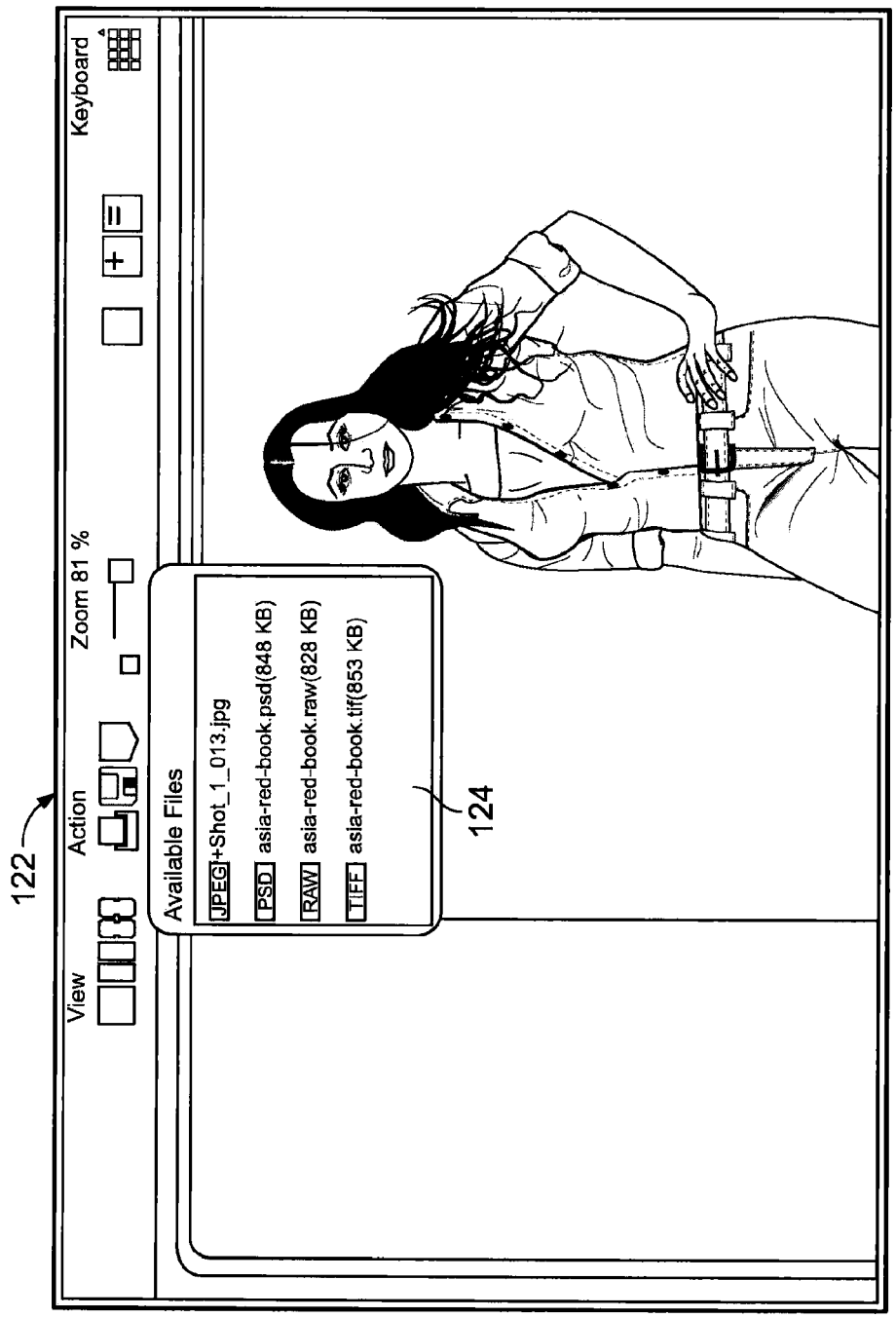
FIG. 6 Illustrates an example of a user interface to allow the user to download any available asset derivative.

Users on the system can download all available file types through the user interface. Thus, when a user selects a particular thumbnail image from the images displayed, for example, in the screen of FIG. 2, the user interface displays an enlarged version of the selected image and displays an icon to permit the user to obtain a list of all available files having the same name, but different extensions, as the selected image file (see FIG. 6). In a particular implementation, upon selection of the download "Action" icon 122, a list 124 is displayed of all available files, their file formats, and the size (e.g., in megabytes) of each file. The user then can click the desired file to cause the system to present that file to the browser for user download so that the particular digital image in the file is displayed through the user interface. In some implementations, upon selection of a particular file for download, the system automatically sends a message to an administrator to permit tracking of downloaded high-resolution or other images so as to facilitate billing.

As explained below, in the illustrated implementation, the availability to a particular user of the high resolution file mapping service is determined by the particular role associated with that user for the specific job.

Dynamic Roles Assignment and User Level Image/Data Interchange

Figure 7:
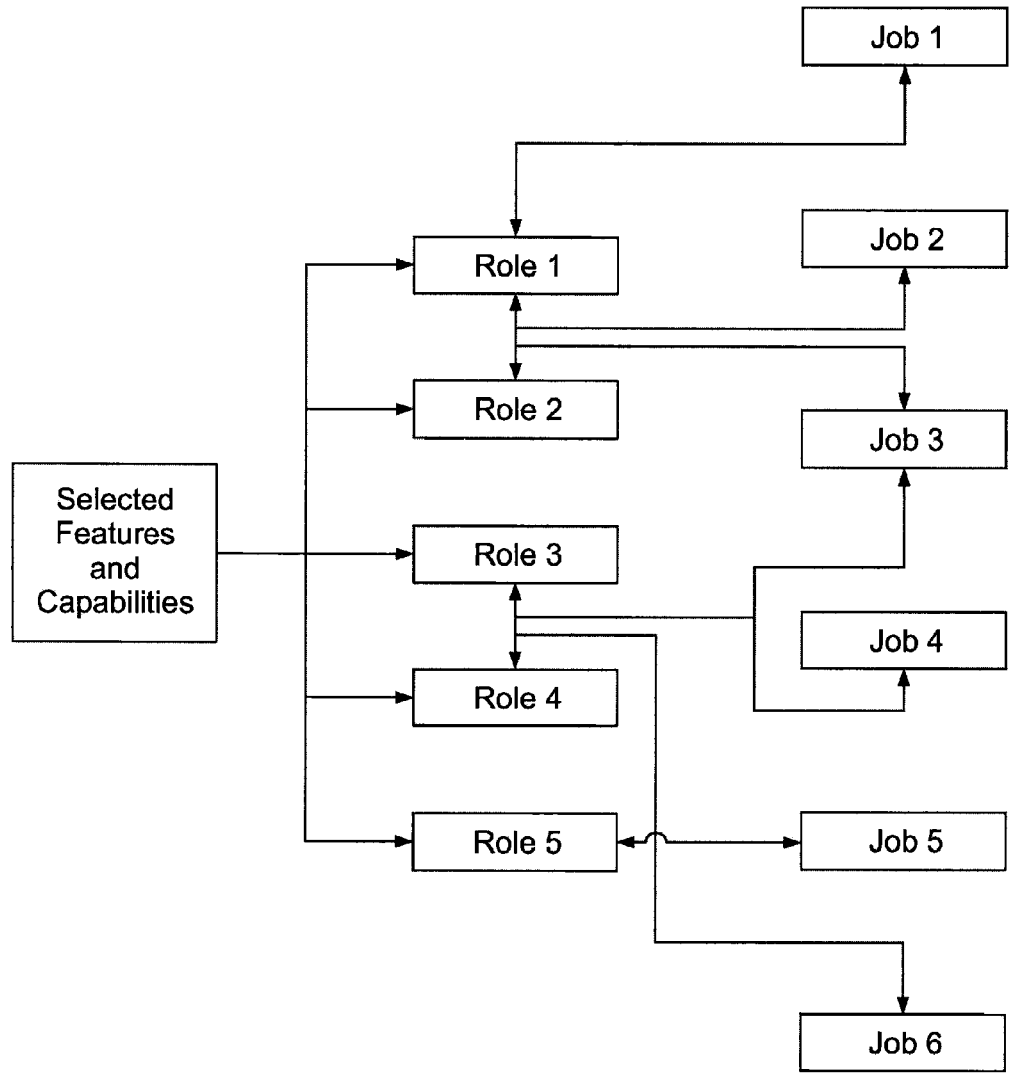
FIG. 7 illustrates an example of the relationship between roles and jobs.

In another aspect, the system allows an administrator (or other user) to define customized roles each of which combines elements of functionality and access privileges. For example, each role defines what features and capabilities of the system individuals in that role have access to. Individual users or groups of users then are assigned access to individual jobs within the context of a role. Preferably individual user and groups cannot be assigned access to a job without first assigning a role to the user or group. Each user then can navigate the system user interface and is presented with the functions and privileges provided by the user's role for each individual job. As illustrated generally by FIG. 7, different roles may be associated with different jobs such that an individual assigned to a particular role with respect to a particular job has access privileges and capabilities defined by that role.

An administrator can utilize the dynamic role assignment functionality in several ways, including creating and managing system roles on a per-account basis or assigning system roles to individual users on a per-job basis. FIG. 8 illustrates an example of a user interface screen that allows the administrator to create and define roles. All or some of the available features can be grouped together to define the features permitted for a particular role. The roles creation and management function allows all available ratings and tools to be assembled into granular roles. The administrator can assign various capabilities (e.g., kill, select, alternate, approve, and notes) to any role and determine whether the particular function should be hidden, viewable, or modifiable for that role. In addition, the system allows the administrator to implement the role as one that is shared (i.e., all ratings are viewable by other shared roles) or as one that is private (i.e., ratings are saved and viewable for each individual user in that role).

Once a role is defined, it can be applied to a user and mapped to any job on the system. FIG. 9 illustrates an example of a user interface screen that allows the administrator to assign a user to particular roles and jobs. To have access to a job on the system, a user must be assigned to a job in a particular role. Thus, roles can be assigned to individual users not only at the system level, but at the job level. This allows the administrator to provide varying levels of access to jobs for each user on the system. Thus, a particular user may be assigned to a role that provides one set of functions and access privileges with respect to a first job and may be assigned to another role that provides him with a different set of functions and access privileges with respect to a second job. For example, with respect to a first job, the user may be granted the rights to mark "selects" only, whereas with respect to a second job the user may have full rights to mark "selects," "kills," "alternates," "approvals" and "notes." Preferably, only the tools for which the user has permissions to use are made available to that user, regardless of where the digital assets (e.g., images) from a given job are moved on the system (e.g., library, lightboxes, cart, portfolios). To facilitate the administrator's establishing roles, one or more pre-defined roles can be defined and made available to provide a starting point. Nevertheless, the administrator can define an unlimited number of custom roles.

Similar techniques can be used to define roles not only at the system or job level, but also at any other level (e.g., at an individual folder level).

Job access can also be marked for expiration on a certain date or after a specified time elapses. In that case, the user will have access to the job within the context of the applied role until the expiration date occurs. Once that date comes, access can be revoked, or the role can change. For instance, a user may have seven days during which he is permitted to mark ratings for a job. After the seven day period, the user may have the right to review images only and have no permissions to change ratings options.

Image/Data interchange describes the system interactions captured by the system. The interactions can be stored, for example, in a database. These interactions include, but are not limited to, entries made by users to indicate image ratings (e.g., select, alternate, kill, approve), notes and other edits as well as interactions such as access history.

User interactions with the system can be enabled in isolated, shared, or hybrid mode. In particular, at the role level, image/data interchange can be implemented in any of those modes. Thus, user image/data sharing is defined at the role level where rights are granted and implemented per job as described above.

In the isolated mode, user interaction is isolated for each user in that role (see FIG. 10A). Thus, for example, all ratings and notes to the digital assets made by a particular user in that role can be viewed and edited by that user only. Nevertheless, administrators or others assigned to a different role may still be able to access such ratings and notes depending on the privileges assigned to that role.

In the shared mode, user interaction is shared (see FIG. 10B). Thus, for example, all users in a particular role can view and edit image ratings and notes, regardless of which user assigned to that role initially made the ratings or notes.

In the hybrid mode, users assigned to the role can review ratings and notes made by all other users. The hybrid mode can be useful, for example, for management and executive usage and collaborative decision making purposes.

The system can facilitate hybrid/shared mode for every tool on the system for each job. For example, the image ratings feature can be enabled in the shared mode while the image notes feature is enabled in the isolated mode with respect to the same image and the same user. This allows for a fundamental separation of shared and private data within the same interface accessing the same content.

For the administrator, the user level image/data interchange provides the flexibility to isolate users from each other and reduce error. It also provides the opportunity for managers to review the work of multiple people to better inform creative decision making. Once the administrator assigns a user to a job in an isolated role, all ratings and information entered into the system for that job can be edited by that user only. In this scenario, the asset ratings are stored separately for each user rather than universally for the asset itself. As a result, many users can be assigned to a single job in isolated roles without requiring the same job to be uploaded multiple times.

For the user, the system provides multiple levels of user level image/data functionality. For example, a supervising user has the ability to review image/data interchange for all users on the system assigned to the same jobs. In this case, the filtering, sorting and review features allow the supervising user to view system conditions for specific users or groups of users. For instance, a user in a supervisory role could review "selected" or "killed" images for a specific user or group of users. The separation of ratings from the asset also enables the system to generate aggregate information about an asset or collection of assets. For instance, a supervisor may want to review all "selected" images in two recent jobs by two users in a group, but not by a third user in the group.

Also, the user level image/data interchange provides "aggregate" and "rules driven" views. For instance, for a network entertainment advertising partner to gain access to a digital asset (e.g., an image), that image must not have been "killed" or marked as not eligible for publicity materials. This condition is set by the system which tracks all users with access to a given image and determines whether it has been marked as a "kill." Similarly, photo editors working in groups can decide, for example, that an image may be approved only if a predetermined fraction (e.g., two-thirds or four-fifths) of the photo editors mark it as a "select." Such information is stored by the system, which automatically applies any such conditions to the status of the image. In this way, individual users work in isolation, but contribute to a collaborative decision-making process determined by the collective input of all users with access to certain media.

Other implementations are within the scope of the claims.

What is claimed is:

1. A machine-implemented method for uploading digital assets from a source media directory into a web-based digital asset management system, the method comprising:
   representing a structure of the source media directory, and the digital assets, as a first XML object, wherein representing the source media directory structure and the digital assets as a first XML object includes recursively traversing the source media directory to build the first XML object;
   storing the first XML object in a database;
   creating a second XML object representing the structure of the source media directory, wherein the second XML object contains no information about the location, name and properties of the digital assets;
   storing the second XML object in the database; and
   providing a visual display, through a web-enabled user interface, of the source media directory structure based on the second XML object and a visual display of one or more digital assets based on the first XML object, wherein the first XML object includes a relational folder structure indicative of where folders in the source media directory are located with respect to one another.

2. The method of claim 1 including providing a visual display, through a web-enabled user interface, of the source media directory structure based on the first XML object.

3. The method of claim 2 further including providing a visual display, through the web-enabled user interface, of one or more digital assets based on the first XML object.

4. The method of claim 1 wherein the first XML object further includes information indicative of the location of the digital assets within the source media directory.

5. The method of claim 1 wherein the first XML object includes information about the location, name and properties of the digital assets.

6. The method of claim 1 wherein the source media directory includes a sub-directory.

7. The method of claim 1 including uploading the source media directory structure from a client location.

8. A system for uploading digital assets from a source media directory into a web-based digital asset management system, the system comprising:
   a database;
   a server operable to represent the source media directory structure, and the digital assets, as a first XML object, to represent the structure of the source media directory as a second XML object that contains no information about the location, name and properties of the digital assets and to store the first and second XML objects in the database, wherein the server is operable to represent the source media directory structure and the digital assets as a first XML object by recursively traversing the source media directory to build the first XML object and wherein the first XML object includes a relational folder structure indicative of where folders in the source media directory are located with respect to one another; and
   a web-enabled user interface coupled to the server and operable to display the source media directory based on the first XML object, wherein the web-enabled user interface is operable to display the source media directory structure based on the second XML object and to subsequently display one or more digital assets based on the first XML object.

9. The system of claim 8 wherein the web-enabled user interface is operable to display one or more digital assets based on the first XML object.

10. The system of claim 8 wherein the first XML object further includes information indicative of the location of the digital assets within the source media directory.

11. The system of claim 8 wherein the first XML object includes information about the location, name and properties of the digital assets.

12. The system of claim 8 wherein the source media directory is operable to consolidate aspects of digital photography workflow.

13. An article comprising a machine-readable medium storing machine-readable instructions that, when applied to the machine, cause the machine to:
   represent a source media directory structure of digital assets and the digital assets, as a first XML object, wherein representing the source media directory structure and the digital assets as a first XML object includes recursively traversing the source media directory to build the first XML object and wherein the first XML object includes a relational folder structure indicative of where folders in the source media directory are located with respect to one another;
   store the first XML object in a database;
   represent the structure of the source media directory as a second XML object, wherein the second XML object contains no information about the location, name and properties of the digital assets;
   store the second XML object in the database; and
   facilitate a web-enabled user interface to:
      display the source media directory structure based on the second XML object; and
      display one or more digital assets based on the first XML object.

14. The article of claim 13 including machine-readable instructions that, when applied to the machine, cause the machine to facilitate a web-enabled user interface to display the source media directory structure based on the first XML object.

15. The article of claim 14 including machine-readable instructions that, when applied to the machine, cause the machine to facilitate the web-enabled user interface to display one or more digital assets based on the first XML object.

* * * * *